Oct. 31, 1939.  A. G. MELLINGER  2,178,182
VALVE STRUCTURE
Filed March 31, 1939  2 Sheets-Sheet 1
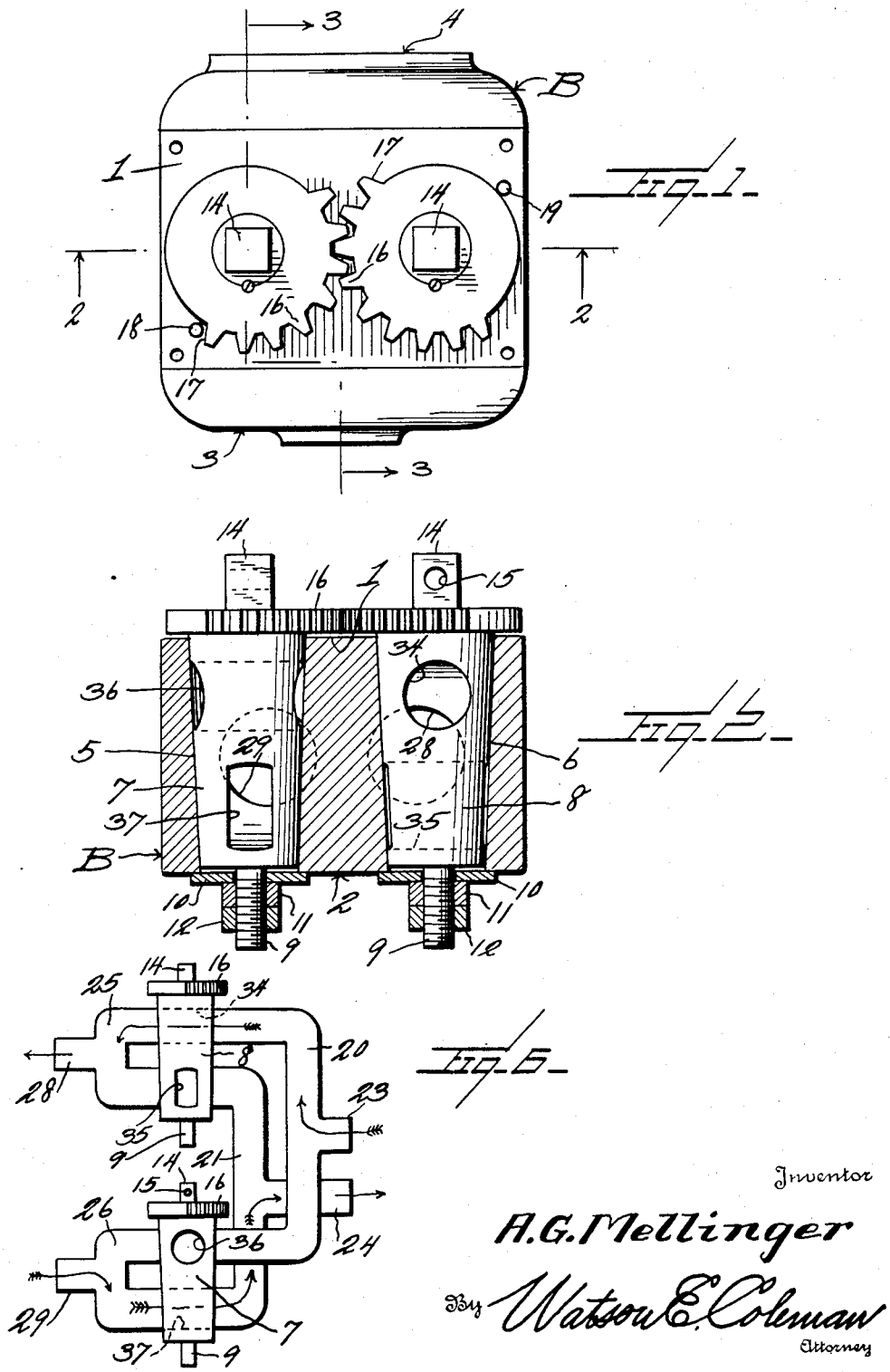
Inventor
A. G. Mellinger
By Watson E. Coleman
Attorney

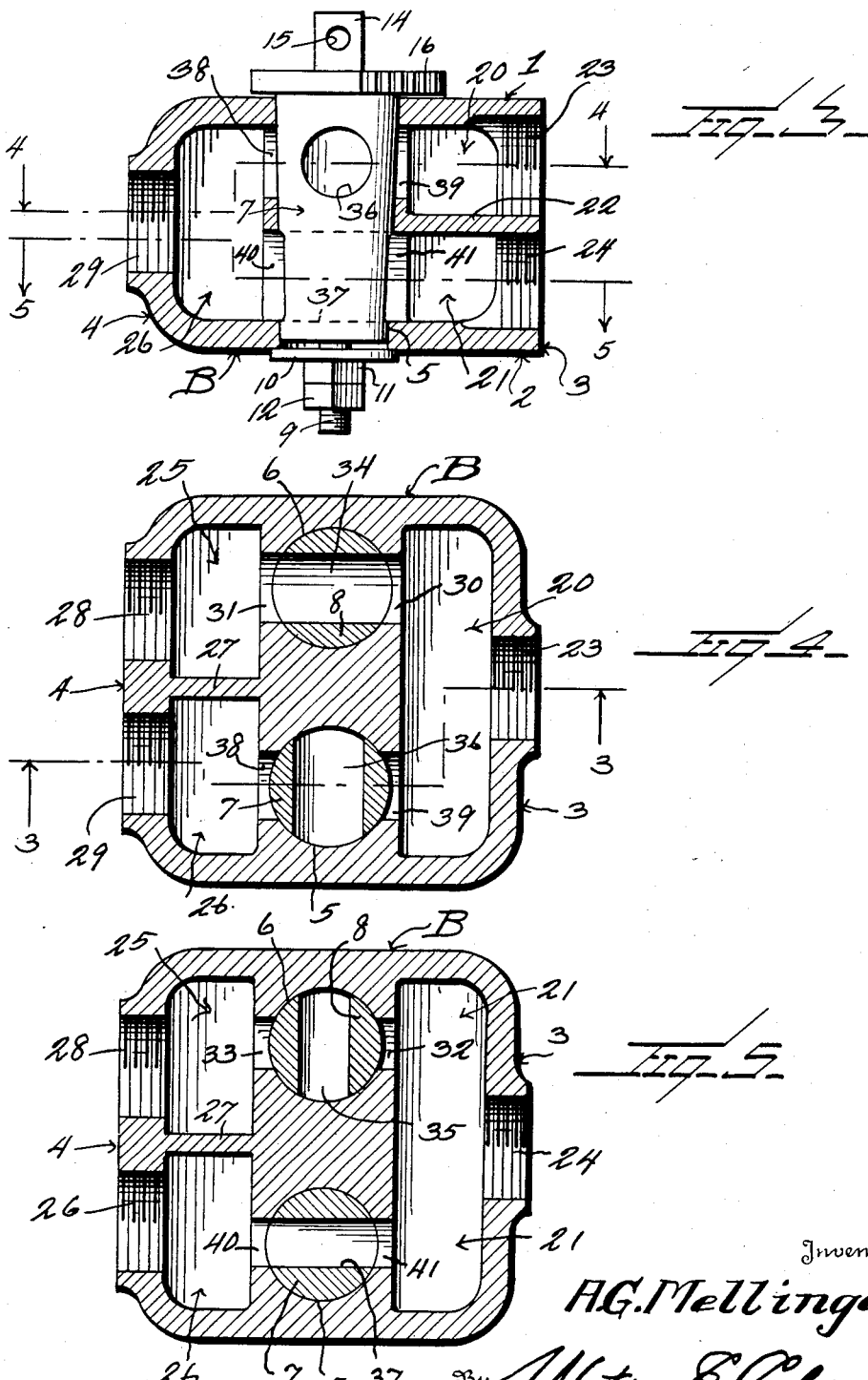

Patented Oct. 31, 1939

2,178,182

UNITED STATES PATENT OFFICE 2,178,182

VALVE STRUCTURE

Arthur G. Mellinger, Lancaster, Pa., assignor of one-third to Harry F. Morgan, Lancaster, Pa.

Application March 31, 1939, Serial No. 265,302

3 Claims. (Cl. 277—4)

This invention relates to a valve structure and it is an object of the invention to provide a structure of this kind of a four-way type and wherein the assembly is such as to readily permit a reverse flow of fluid at the eduction side of the structure with the flow at the induction side being at all times in the same direction.

It is also an object of the invention to provide a structure of this kind including a casing having an inlet and a discharge at one side, together with openings at the opposite side with means whereby flow through the last named openings may be reversed at will without changing the direction of flow into the casing through the inlet or out of the casing through the outlet.

The invention consists in the details of construction and in the combination and arrangement of the several parts of my improved valve structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a valve structure constructed in accordance with an embodiment of my invention.

Figure 2 is a sectional view taken substantially on the line 2—2 of Figure 1, looking in the direction of the arrows.

Figure 3 is a sectional view taken substantially on the line 3—3 of Figure 1, looking in the direction of the arrows, and also on the line 3—3 of Figure 4.

Figure 4 is a sectional view taken substantially on the line 4—4 of Figure 3, looking in the direction of the arrows.

Figure 5 is a sectional view taken substantially on the line 5—5 of Figure 3, looking in the direction of the arrows.

Figure 6 is a diagrammatic view illustrating the manner of flow of liquid through the structure.

As disclosed in the accompanying drawings, my improved valve structure comprises a body member B preferably made of a high grade bronze, although I do not wish to be understood as limiting myself in this respect. This body B, as herein disclosed, is hexagonal in form and, as illustrated in the accompanying drawings, said body B, or casting as it may also be called, has a top face 1 and a bottom face 2, together with a front face 3 and a rear face 4. These faces 1, 2, 3 and 4 are identified in order to facilitate description.

The body B has disposed entirely therethrough from the top face 1 to the bottom face 2, two spaced openings 5 and 6, each of which, as herein embodied, tapers from the face 1 of the block B to the face 2. Snugly fitting within the openings 5 and 6 are the rotating valve members 7 and 8 respectively, each of said valve members being ground to assure a perfect leak proof fit within its opening. The smaller end of each of the valve members 7 and 8 at its axial center is provided with an outstanding threaded shank 9 preferably integral therewith. Freely surrounding the shank 9 is a washer 10 of a diameter in excess of the adjacent smaller end of an opening 5 or 6 and which washer 10 has direct contact with the adjacent bottom face 2 of the block or casting B.

Threading upon each of the shanks 9 is an adjusting nut 11 having direct contact with the washer 10 and which nut assures the proper seating of a valve member 7 or 8. Also threading on each of the shanks 9 and coacting with the nut 11 thereon is a lock nut 12. The upper or larger end of each of the valve members 7 and 8 at the axial center thereof is provided with an outstanding shank 14 herein disclosed as annular in cross section and with which a suitable implement may be engaged to effect the desired turning of the valve member. The shank 14 also has disposed therethrough an opening 15 to allow the insertion therethrough of an operating lever rod, if so desired.

The upper or larger ends of the valve members 7 and 8 are provided with the meshing arcuate racks 16 whereby the valve members 7 and 8 are connected for unitary rotary movement at the same peripheral speed. These racks 16 are so constructed that the end teeth of the racks provide shoulders 17. A shoulder 17 of one of the racks contacts with a stop lug 18 carried by the face 1 to positively limit the unitary turning movement of the valve members 7 and 8 in one direction, while a shoulder 17 of the second rack contacts with a second stop lug 19 carried by said face 1 for positively limiting the unitary turning movement of the valve members 7 and 8 in the opposite direction.

The front portion of the block or casting B is formed to provide two vertically spaced chambers 20 and 21, separated by a partition 22. The central portion of the upper chamber 20 has in communication therewith an inlet port 23 opening out through the front face 3 of the block and which is adapted to be placed in communication with a source of fluid under pressure. The central portion of the lower chamber 21 also has in communication therewith an outlet port 24 opening out through the front face 3 of the block B and adapted to have coupled thereto a pipe line leading to a suitable point of delivery.

The rear portion of the block B is formed to provide the transversely spaced chambers 25 and 26, separated by an intermediate partition 27. The rear portion of the block or casting B has a port 28 communicating with the upper chamber 25 and with a port 29 communicating with the lower chamber 26. When the port 28 serves as an outlet, the port 29 is serving as an inlet or return and vice versa. For example, if the ports 28 and 29 are in communication with the opposite ends of a line having a turbine interposed therein, the direction of rotation of the turbine can be readily reversed by changing the direction of flow through the ports 28 and 29 without in any way effecting the standard direction of flow through the ports 23 and 24.

The upper chamber 20 is in communication with the upper part of the opening 6 through a port 30 and diametrically opposed to this port 30 is a port 31 affording communication with the chamber 25 at the rear of the block B. The chamber 21 is in communication with the lower portion of the opening 6 through a port 32 and diametrically to the port 32, the lower portion of the opening 6 is in communication with the chamber 25 through a port 33. The valve 8 within the opening 6 is provided therethrough with the longitudinally spaced ports 34 and 35 which are so arranged that when one of the ports is in open position, the other port is entirely closed and whereby such reversal of positions of the ports 34 and 35 is obtained upon a quarter turn of the valve member 8.

The port 34 is for coaction with the ports 30 and 31, while the port 35 is for coaction with the ports 32 and 33.

The second valve member 7 is also provided with the longitudinally spaced ports 36 and 37 also in right angular relation. The upper port 36 is for coaction with the port 38 affording communication between the chamber 26 and the upper portion of the opening 5 and with the port 39 affording communication between the upper portion and the chamber 20. The lower port 37 is for coaction with the port 40 affording communication between the chamber 26 and the lower portion of the opening 5 and with the port 41 affording communication with the chamber 21.

It is to be particularly pointed out that when the port 34 of the valve member 8 is in open position, the port 35 is in closed position and vice versa. The port 36 of the valve member 7 is also in closed position when the port 37 is in open position and it is to be further pointed out that when the port 35 is in closed position, the port 37 is in open position.

In view of the foregoing description when considered in connection with the accompanying drawings, it is believed to be apparent that when the valves 7 and 8 are adjusted to position, the port 34 of the valve member 8 and the port 37 of the valve member 7 are in open position, the outflow will be through the port 28 and the return flow through the port 29 and, of course, by adjusting the valve members 7 and 8 to bring the port 35 into open position, together with the port 36, the outflow will be through the port 29 and the return flow through the port 28.

It is also believed to be obvious that while the direction of flow may be reversed with respect to the ports 28 and 29, the flow through the inlet 23 is always constant as is also the outflow through the port or opening 24.

From the foregoing description it is thought to be obvious that a valve structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A valve structure comprising a casing having two spaced chambers within its front portion and two spaced chambers within the rear portion, the partition between one set of chambers being angularly disposed with respect to the partition separating the second set of chambers, one of the first two chambers having an inlet and the other an outlet, a port in communication with each of the chambers of the second pair and disposed through an outer wall thereof, said casing having two valve seat openings positioned between the two pairs of chambers, a wall of each of the chambers having a port in communication with one of the valve seat openings, a valve member working within each of the valve seat openings, each valve member having two ports disposed therethrough at points spaced therealong for register with the ports affording communications with the opening in which the valve member is seated and the chambers at opposite sides of said opening, and means for moving the valve members in unison, the mounting of the valve members being such to have a port of one member in closed position and the corresponding port of the second member is in open position and with the second port of one valve member open when the second port of the other valve member is closed.

2. A valve structure comprising a casing having two spaced chambers within its front portion and two spaced chambers within the rear portion, the partition between one set of chambers being angularly disposed with respect to the partition separating the second set of chambers, one of the first two chambers having an inlet and the other an outlet, a port in communication with each of the chambers of the second pair and disposed through an outer wall thereof, said casing having two valve seat openings positioned between the two pairs of chambers, a wall of each of the chambers having a port in communication with one of the valve seat openings, a valve member working within each of the valve seat openings, each valve member having two ports disposed therethrough at points spaced therealong for register with the ports affording communication with the opening in which the valve member is seated and the chambers at oposite sides of said opening, means for moving the valve members in unison, the mounting of the valve members being such to have a port of one member in closed position and the corresponding port of the second member is in open position and with the second port of one valve member open when the second port of the other valve member is closed, and means for limiting the movement of the valve members in either direction to assure the desired register of the ports.

3. A valve structure comprising a casing having two spaced chambers within its front portion and two spaced chambers within the rear portion, the partition between one set of chambers being angularly disposed with respect to the partition separating the second set of chambers, one of the first two chambers having an inlet and the other an outlet, a port in communication with each of the chambers of the second pair and disposed through an outer wall thereof, said casing having two valve seat openings positioned between the two pairs of chambers, a wall of each of the chambers having a port in communication with one of the valve seat openings, a valve member working within each of the valve seat openings, each valve member having two ports disposed therethrough at points spaced therealong for register with the ports affording communications with the opening in which the valve member is seated and the chambers at opposite sides of said opening, and means for moving the valve members in unison, the mounting of the valve members being such to have a port of one member in closed position and the corresponding port of the second member is in open position and with the second port of one valve member open when the second port of the other valve member is closed, said valve members being rotatable.

ARTHUR G. MELLINGER.